United States Patent [19]

Fahrner

[11] Patent Number: 4,752,079
[45] Date of Patent: Jun. 21, 1988

[54] ENHANCED TRACTION WHEEL ASSEMBLY

[75] Inventor: Don A. Fahrner, Huntsville, Ala.

[73] Assignee: Surfco, Huntsville, Ala.

[21] Appl. No.: 760,774

[22] Filed: Jul. 31, 1985

[51] Int. Cl.$^4$ .......................... B60G 21/00; B62D 9/00
[52] U.S. Cl. ................................ 280/112 A; 280/661;
152/208; 301/43; 180/282
[58] Field of Search ................... 280/112 A, 93, 96.3,
280/96.1, 96.2 R; 188/18 R; 301/43, 41 R, 44 R, 44 T; 152/208

[56] References Cited

U.S. PATENT DOCUMENTS

| | | | |
|---|---|---|---|
| 3,130,767 | 4/1964 | Davis | 301/43 |
| 3,137,513 | 6/1964 | Marot | 280/112 A |
| 3,679,015 | 7/1972 | Roe | 280/112 A |
| 4,159,128 | 6/1979 | Blaine | 280/112 A |
| 4,191,274 | 3/1980 | Goldberg et al. | 180/282 |
| 4,515,390 | 5/1985 | Greenberg | 280/112 A |
| 4,519,627 | 5/1985 | Shibahata et al. | 280/112 A |
| 4,546,997 | 10/1985 | Smyers | 280/112 A |

OTHER PUBLICATIONS

Universal Joint and Driveshaft Design Manual, Advances in Engineering, No. 7; published by The Society of Automotive Engineers, Inc.

Primary Examiner—Richard A. Bertsch

[57] ABSTRACT

A wheel capable of changing traction surface and track by varying the usual axis of rotation. The amount of this contacting surface can be varied and the path can be varied from usual linear to curvilinear contact. Full X, Y, and Z operation is characterized by largely symmetrically curved sinoisoidal-like motion.

49 Claims, 7 Drawing Sheets

PRIOR ART

ENHANCED TRACTION WHEEL ASSEMBLY

This invention relates to a wheel assembly which in system configuration, because traction can be varied, offers superior performance and roadability in almost all conditions. It is thought to most closely relate to U.S. Class 180. Besides a search of patent literature, some of the more interesting or helpful publications precedent to this invention were SAE publication Library of Congress #79-63005 titled Universal Joint and Driveshaft Design Manual, edited by E. R. Wagner and a Road and Track article titled Reduced Rolling Resistance=Increased MPG in the June 1980 issue. Heretofore balanced and smoothly variable traction for vehicles has been expensive and at the least inconvenient. As will be seen in the following disclosure almost all present disadavantages have been overcome.

Regardless of whether vehicles are designed for so-called on or off the road use or all weather use present wheel systems have severe limitations. For example consider that performance parameters of traction as opposed to tread life and rolling economy tend to be mutually limiting with present systems. But if the wheel can vary traction, that is to say the amount of contact surface can be selectively increased or decreased, then in addition to the increased friction or grip because of an increase in the contact surface it will be realized that the performance parameters or constraints tend to be not nearly as severe. Since the traction segment of the contact surface is not in constant surface contact tread life and rolling economy are much improved. Also it is apparent there can be more friction with a softer compound in the traction segment of the tread, with a more aggressive tread pattern, or with abrasive elements such as studs in the tread. These however are not usually feasible in present unchangeable contact surfaces, at least to the extent possible in a selectable surface system.

Traction is vital in acceleration or deceleration and cornering. Various anti-skid systems have been devised. These typically modulate brake pressure at each wheel or wheel set. It is to be noted these are to improve inherently poor traction characteristics of present systems which are however largely overcome by this invention.

Figure 7:
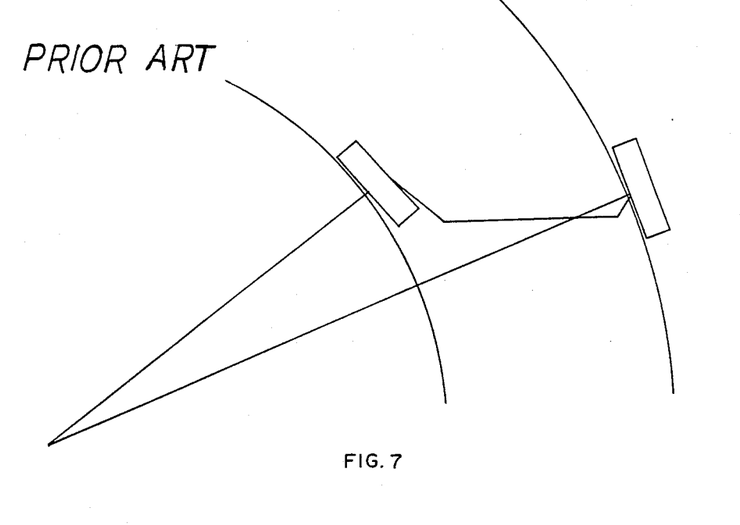
FIG. 7 shows a typical present wheel in system configuration

As mentioned above present wheel systems have severe limitations. In deceleration problems of control from uneven braking have resulted in numerous accidents, when vehicles do not respond to steering and desired direction. Also as mentioned above are various anti-skid or anti-lock systems which have been devised but because of expense and, until recently at least, technical imperfection, these systems which modulate brake application and thus wheel rotation have not gained wide acceptance. It is important to realize as will be understood that these anti-skid or anti-lock brake systems are required mainly because, when the vehicle is turned, the wheels are required to operate at different speeds. But it will be appreciated that because the radiusing capability increases traction by progressive application of desired contacting surface that the need for these systems is lessened. The interfunctioning of brake, throttle, steering, and accelerometer parameters by signal and microprocessors will be related. Although the need for anti-skid capability would be lessened it could be adopted with the radiusable wheel. This functioning will apply regardless of whether contacting surfaces are curved or radiusable so that inside and outside wheels are radiused so that rotation corresponds to turning circles as in FIG. 7, whether wheels are driven by a power flow in the type of differential allowing one side to spin freely or of the type with proportionate rotation, whether wheels are non driven, or whether the contacting surface assumed curvature does not allow true radiusing as in FIG. 7, but requires a slipping differential. Also to be understood as will be shown in conjunction with flexible side and contacting surfaces in which as the wheel is radiused and because of centrifugal force loading there will be changeable air pressure capability which because of its speed of adjustment and of its increasing the flexile capability on surface irregularities or broken surfaces is desirable. This changeable pressure is exemplified by literature previous to the below referenced patent. It is understood that this changeable air pressure capability is used with a wheel as described with the radiusing capability. A main fault of present vehicles is that wheel speed of both outside and inside wheels tends to be the same. The result is a directional force different from the turning path as shown in FIG. 7. On traction capable surfaces this force and centrifugal force are often assimilated without untoward effect. However on other poorer traction surfaces such as slippery or sloped surfaces whether sideways or along the path of vehicle travel the wheels often slip.

This type of slipping is well known and so is described briefly. The consequences however can be calamitous. Regardless of whether vehicles are equipped with standard drive systems which allow the slipping wheel or wheels to overspeed or have so-called limited slip differentials traction is a compromise. Also known are various engaging hubs or jaw clutches which can engage or disengage wheels. But regardless of whether drive is direct to each wheel as would be the case when power is transmitted directly by a driving member to each wheel or less directly through a differential regardless of type there has been the problem of unbalanced traction. For example one of the more common present wheel drive systems can have power at rear non-steered wheels. Looking at FIG. 7 shows all wheels having a different speed when turning. It is known that vehicles equipped with limited slip differentials have an added non desired directional force when turning. Even so-called four wheel drive vehicles vary fractionally in having traction from anywhere in the range of from say two or three but never attain a balanced traction with all four wheels except when vehicle is in equilibrium.

It is disclosed that the required differential action to different wheel speed when vehicles are turning can be achieved by changing effective radii of wheels. It will be seen that with wheels steered there is the same speed transmitted. This is because it is possible to driveably connect wheel sets without differentials because steering which is operably connected to radius the wheels causes the inside wheel or wheels to assume a smaller radius.

It will be seen from the foregoing how this is a true balanced all wheel drive system. It is worth noting also that some economy of construction is afforded by this balanced all wheel drive. For example, the axial transmitting drive members connecting the wheels need not be quite as strong or heavy because rather than having one or two wheels transmit the drive, the load can be shared by the driving wheels. Also, since traction is much increased with variable contacting surfaces there is less possibility of the load suddenly shifting onto one wheel as with present systems having conventional differentials when one wheel spins.

A brief description of drawings follows.

FIGS. 2, 3, 4 shows a wheel with traction contacting surface operatively coupled with an input member. The main rotating components which are typically termed axles, Constant Velocity (CV) joint, wheel and tire are shown along with actuators for X, Y, and Z movement. The functional interrelationship as well as general operation of these principal components and others are shown.

Aa, ba, ca show contact with minimum traction.

Ab, bb, and cb show increased contact as when turning.

Ac, bc, and cc show increased contact as when turning or braking. It is similar to the previous but is shown with the wheel angled to line of travel.

Bd and cd show contact in softer terrain or in water. The use of bd and cd actuation will be common in conjunction with the side action shown in ad.

Ad shows sinoisoidal (hereafter abbreviated sin) movement.

Figure 1:
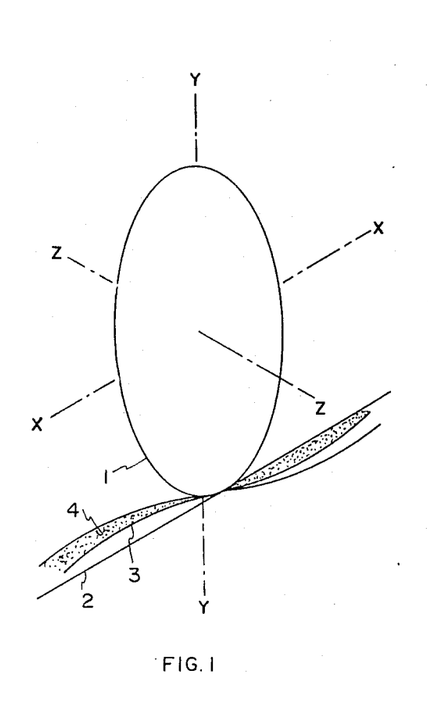
FIG. 1 shows the 3 axes of wheel movement, X being representative of vehicle direction, Y is representative of movement in vertical plane and Z is lateral.
Figures 2, 3:
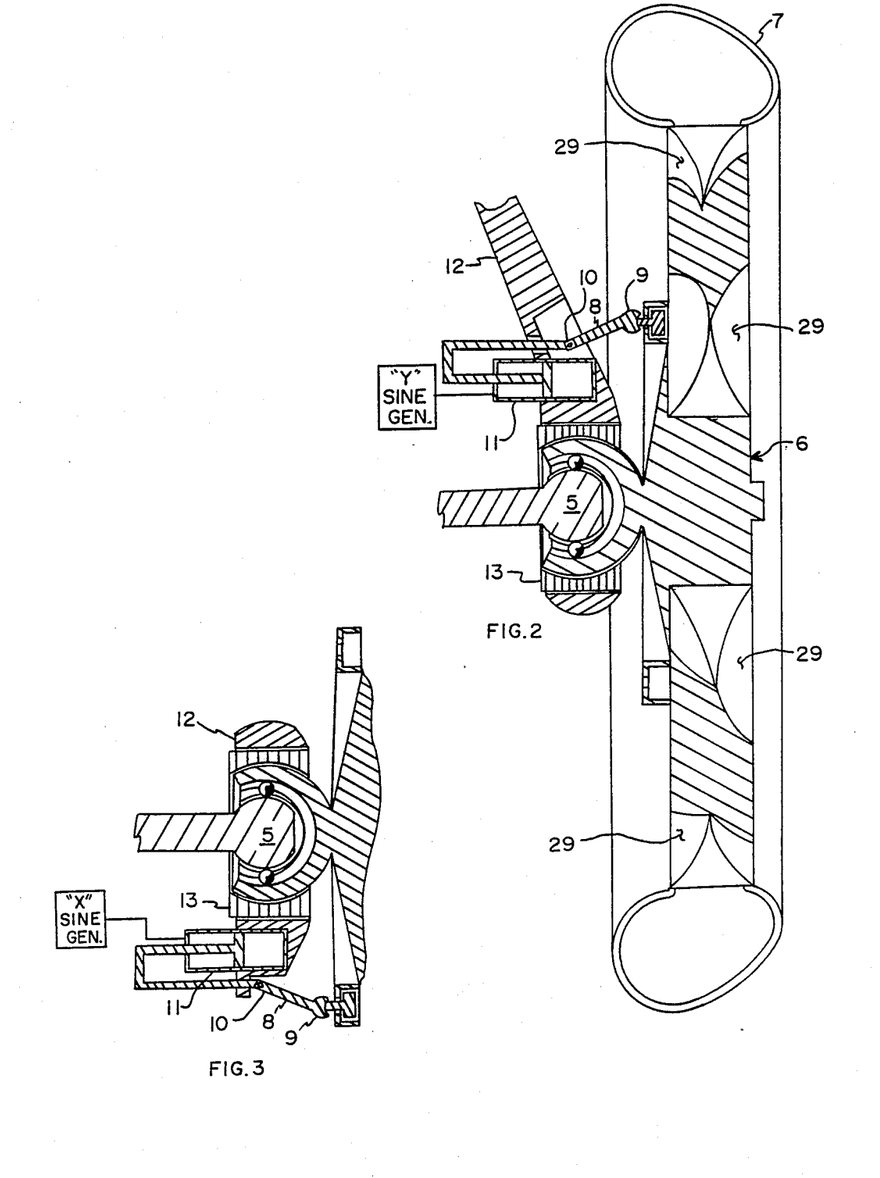
FIG. 2 is a side view of the wheel assembly taken along line 2—2 of FIG. 5.
FIG. 3 is a top view taken along lines 3—3 of FIG. 5.
Figure 5:
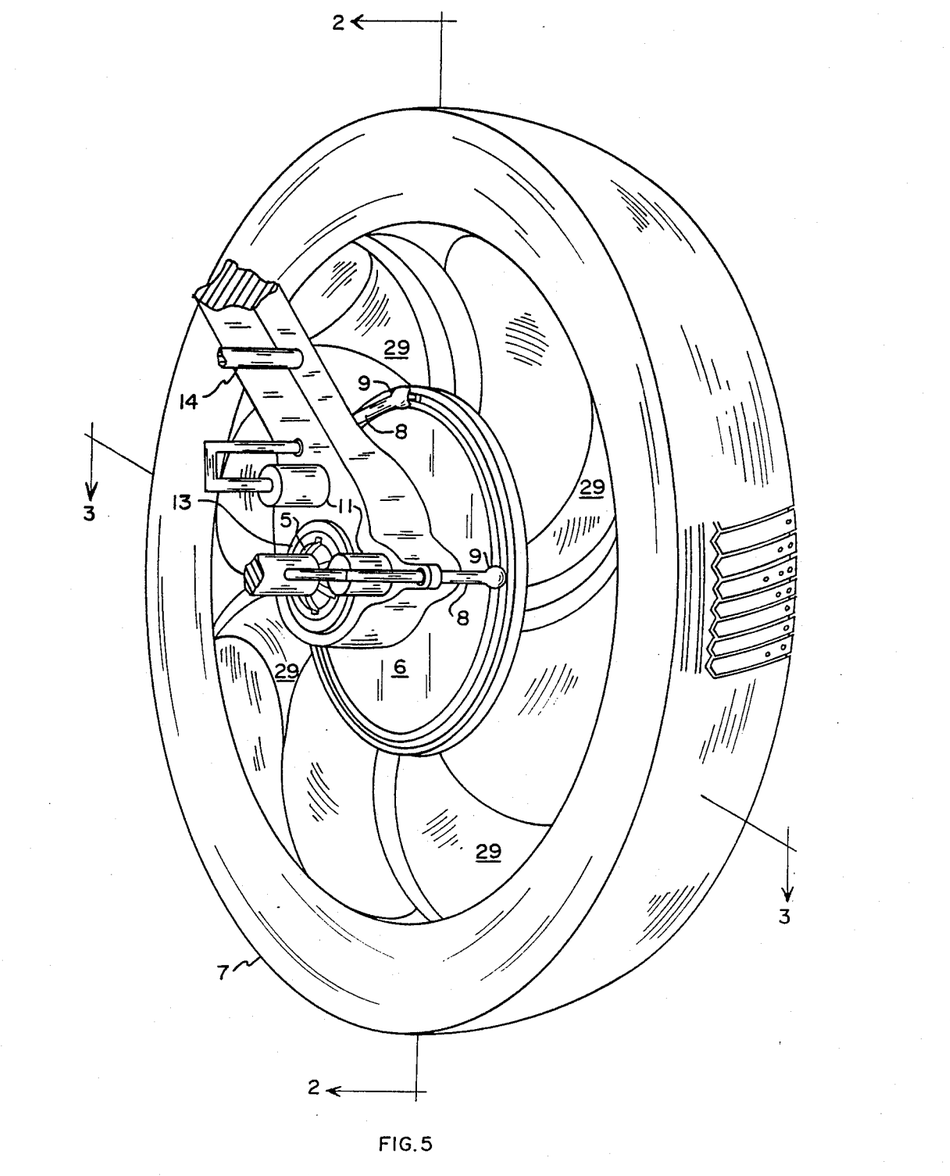
FIG. 5 is a side sectional view.

A more comprehensive description relating drawing and operational relationships follows. In FIG. 1 wheel, 1, with wheel coordinates X, Y and Z as stated above is shown. 2 represents wheel path of travel whether movement is linear or curved as when steered. 3 is the sin path of travel when X and Y are actuated. 4 shows the sin movement as changed by the side movement because of Z actuation. Operational advantages will become apparent as the relative angular movements of the wheel are more fully disclosed especially in discussion of FIG. 6. Referring to FIG. 2 and FIGS. 3, 5 represents a universal joint having an input member which may be driven from a source of power coupled to an output member driving a wheel. Continuing with the rotating mass, 6 represents a wheel which has a traction surface or tire-like section 7 (hereafter called contacting surface). This is connected for movement by an arm 8 to the non-rotating part of the vehicle which is equivalent to or a part of the body or frame if the vehicle is not sprung or if the wheel is part of an unsprung suspension the arm is operatively connected to the non-rotating part of the vehicle. The end, 9, of the arm 8 can typically be journaled for bearing action and supportably secured in the rotating wheel 6. The end 10 attached to actuator 11 is pivotable. Actuator movement is transmitted through the arm 8 so that the wheel which has a nominal effective center of movement at the X, Y, and Z axis in the universal joint is moved. It will be seen that the end 10 is pivotable in one plane whereas the ball at the end 9 allows movement in more than the one plane. Operation of the actuated wheel for different conditions will be further disclosed especially in discussion of FIG. 6. Continuing with FIGS. 2 and 3 the actuator is shown attached to the carrier 12. The CV joint couples the input and output members within and is supported by the side slider 13 which is supported by the carrier. The CV joint as the effective pivot or center of movement of the wheel about which the wheel is steered and angled is rotatably moveable within the side slider which is itself sideways moveable within the carrier. The side slider is preferably splined against rotation within the carrier.

The carrier can be set between upper and lower suspension arms having ball joints between which the carrier can rotate so that the wheel is turned for steering. Or, for example, the upper suspension element is a strut as in the MacPherson type suspension, the carrier can serve as part of the suspension structure.

Shown at 14 is a steering arm operatively connected to receive transmitted steering movement from a steering source. It is advantageous to connect steering movement through to the carrier and avoid adjustment means which would otherwise be necessary if connection were to the wheels which because they move inwards and outwards along the Z axis would necessitate means to accommodate dimensional changes in steering linkage.

FIG. 3 is similar to FIG. 2 and is a top view through the center of the CV joint. Whereas in FIG. 2 the actuator, which is shown vertically above the CV joint, so the wheel can be angled or radiused on the Y or vertical axis, in FIG. 3 an actuator for rotational movement around the Y axis is shown. Joint actuation of actuators gives the sin-like movement. Operation or actuation for enhanced traction will be described in discussion of FIG. 6.

Figure 4:
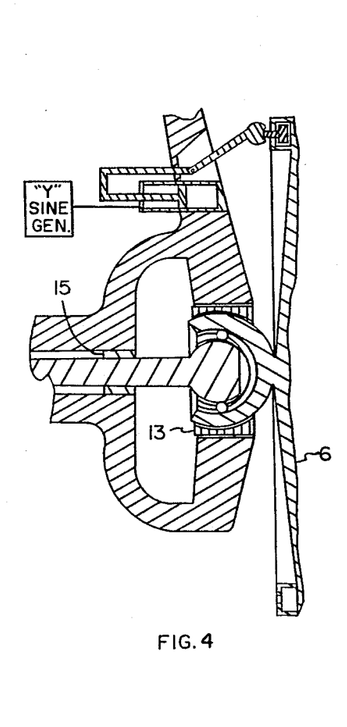
FIG. 4 is likewise similar to FIG. 2 but shows wheel assembly without steering and suspension such as might be used on either non-steered and/or non-sprung applications.

FIG. 4 is somewhat similar to FIG. 2. It is a partial cross section view through the vertical axis which passes close to the center of the CV joint. It differs from FIG. 2 in showing the input member rigidly journaled, that is the input member is in fixed angular relation to the carrier or member supporting the CV joint whereas FIG. 2 is illustrative of the type suitable for independent suspensions. Often vehicles especially those with independent suspensions have another coupling, usually of the CV type, since the swinging of the wheel requires axial sliding in the coupling. With the Z type side action this axial side movement is increased. This second coupling (not shown) having counterpart capabilty to the wheel coupling is also required so that non-uniform velocity is not generated or is minimized. Having couplings which do not generate non-uniform velocity can be important. Conventionally wheels in sets such as left and right with the slipping or partial slipping provided by conventional differentials will tend to accept any non-uniform velocity. However for complete, true balanced all wheel traction the absence of this velocity is desirable.

A closed axle, that is the type having a pipe-like enclosure around the driving axle is shown with the axle journaled for support as shown at 15. An open axle without the enclosure would derive support from journaling in the carrier or CV support member. If the wheel is not driven, that is not connected to a power source, then the input member would be a stub axle connected to or supported in the carrier. Although a carrier is shown if the vehicle is unsuspended, that is without a chassis having suspension, it will be understood the wheel could by attachment derive equivalent support from the vehicle itself. This sin-side capability is applicable regardless whether the wheel is steered, part of a chassis with a suspension, or driven by connection to a power source.

Figure 6:
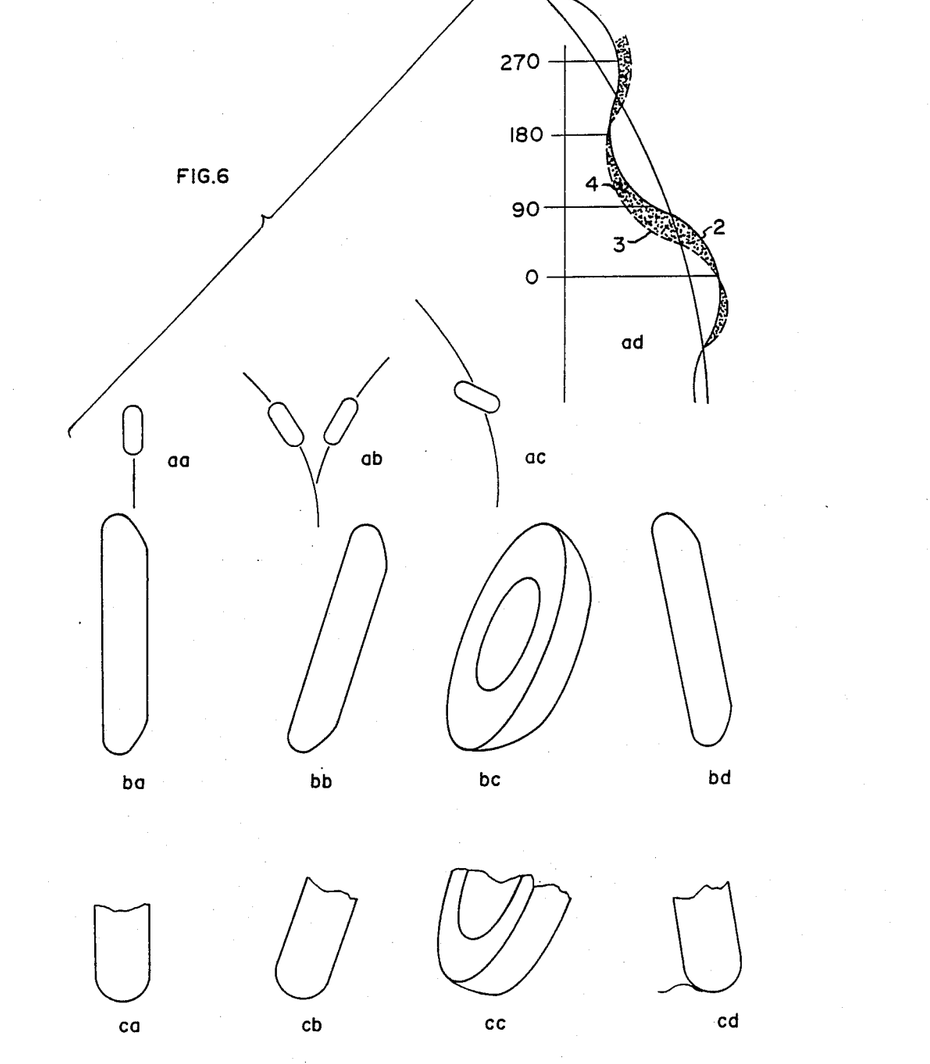
FIG. 6 is a view of wheel paths with wheel contact area superimposed on line of travel and also of the wheels shown with representative amounts of X, Y and Z actuation.

FIG. 6 shows a wheel actuated or angled for various traction requirements which can vary from minimum through maximum contact. Aa, ab, ac show, from above, the contact area on the direction of travel. While aa shows linear travel, ab and ac show curved travel. Ba, bb, bc, and bd which are asymmetrical and also ca, cb, cc and cd which are symetrical in cross section are shown in end view. Minimum contact and traction is shown in aa, ba, and ca. This contact is preferred for constant speed and good road surface. There is minimum rolling resistance which results in fuel economy because power required for light acceleration on good surfaces or cruising is minimized. Also when coasting or free wheeling the non-powered distance is increased. This minimum contacting surface will often be characerized by a so-called "hard" compounded tread surface, often by a tread pattern which is linearly continuous around the circumference, and often by a wheel having variable air pressure capability which with different side surface support strength and with the angulation capability, result in a lesser contacting surface.

Increased contact is shown in ab, bb, and cb. Because there is more friction this is used when change in momentum and/or direction is required such as when turning or decelerating or both together. Ac, bc, and cc are similar to ab, bb, and cb in having increased contact. There is more axis angulation so that the X axis of the wheel is angled more to the line of travel. Although the contact area can be the same as ab, bb, and cb there can be more friction. This can be understood by the examples of moving an eraser across a desk with the eraser following line of travel and then angled to line of travel as in ac, or, as when one skis, angling skis to the snow plow position. Or an appreciation of this manifold increase in force can be gotten from the steered wheels as in FIG. 8 which are able to turn the vehicle against considerable inertial force. Reckoning it will be seen that when the wheels are angled or radiused one to the other somewhat the same force is transmissible and of course is steerable. Actuation for movement to vary travel along the X axis will often be used.

Bd and cd show a wheel in contact on softer terrain or water. While aa, ba, ca, ab, bb, cb, ac, bc, and cc above show contact on usually firm surfaces, the more common surfaces for bd and cd could be mud, sand, or snow. These and water are characterized in that there can be some traction from the tread or circumference on the maximum wheel diameter as with regular tires, as well as the side surface of the wheel whether done by a little of the side surface as shown or more if, for example, in water. Snow on ice is one of the most difficult surfaces on which to obtain traction. Of course with studs or traction enhancers on part of the surface, usually that part used for more than minimum traction, ice becomes a more tractable surface. And, depending on how hard the snow is and on other factors there is the important advantage of the side force exerted by the angled wheel.

Ad shows a sin path of travel. Aa and ac show a wheel going straight and being turned. Bd and cd show the wheel exerting side traction. For the wheel to exert side force over a longer distance and yet have its path of travel approximating and remain close to the vehicle line of travel it must be actuated sideways first one way and then oppositely the other way. In ad the solid line 2 represents a curvi-linear path of travel without side movement, the broken line 3 travel with side force obtained by side movement, and the stippling 4 between the lines the amount of side movement.

Regardless of amount of traction and vehicle direction the wheel can begin sin movement whether starting from any position in aa, ab, or ac if there is Z axis or sideways movement possible. Actuators as discussed above in connection with FIGS. 3 and 4, 2 will angle or radius the wheel. A requirement for angulation is that the contacting surface of the rotating mass of the wheel have the equivalent of a ball joint as shown at 9 and a joint as at 10 which moves in one plane through which actuation of the contacting surface is done. It will be realized that variations in positioning of type and shape of actuators is possible without changing the consequent result at the contact surface. In conjunction with the universal joint 5 which, with the actuator connection which will preferably provide some or all support as suspension locating members, and with side slider 13, the contacting surface of the rotating mass is moved vertically on the Y axis, moved on X and is also movable sideways on the Z axis.

Although the wheel can be angled as in ac, bc and cc it can also be angled when in sin movement as shown by 3. Of importance is the area 4 on which side force is exerted as in bd and cd. Points of inflection are shown at 90°, etc. It is understood the Sin Controller can change inflection points and it thus determines the direction and distance the wheel runs.

Figure 8:
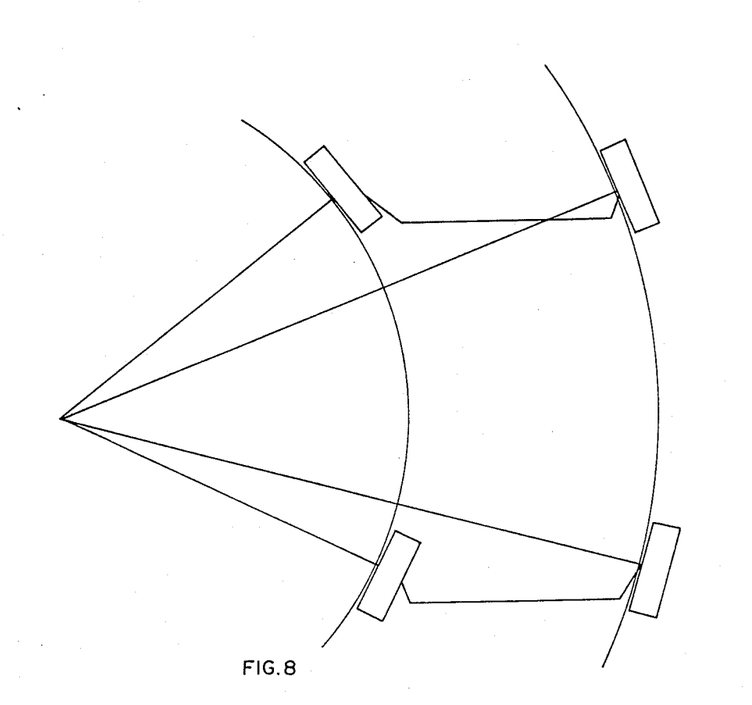
FIG. 8 shows a wheel configuration which shows how with inside wheels radiused more all wheels can move at same axle speed and exert balanced force.

FIG. 7 shows a typical present wheel in system configuration and FIG. 8 shows a wheel configuration with all moving at the same speed and exerting balanced force, respectively. These are comparatively discussed. It will be appreciated that with steerable wheels as shown in FIGS. 2 and 3 with Ackermann type steering on steering arm 14 and as in FIG. 7 which if extended would show a set of power driven wheels at rear and FIG. 8 which shows wheels having sin capability that it is desirable that wheels radius. In other words complementary to steering which arcs the wheels on the Y axis about a common point as shown in FIGS. 7 and 8 there is also the desired capability of radiusing a wheel or the wheels in vertical planes as shown in FIG. 6. This radiusing is important regardless of whether axle sets of more than one wheel are differential equipped which can determine whether the contacting surface curvature of wheels in a set have a common point of radius as in FIG. 8 which means each wheel is radiused or sized differently or whether contacting surface curvature is slight (closely approximating an arc drawn from point of effective curvature at center of universal joint) which would be usual with differential action. In FIG. 6 ab, bb, and cb indicate in conjunction with FIG. 8 how the wheels can be radiused so that regardless of whether vehicle is differential equipped or not there can be the effect of the same axle speed which makes for balanced traction, economy of power, lessened wear on contacting surface, smooth control and quiet ride because of lessened squirm and squeal since all wheels share the load. The need is evident whether one notes the sound of tortured tires on present vehicles cornering on traction capable surfaces or whether one sees the slippage on slick or sloped surfaces when torque tends to be transmitted to the wheels with less traction and because the steering input often differs from the directional momentum of the vehicle. Then too there is always the tendency to yaw or oversteer whenever steerable wheels are turned away from longitudinal axis of the vehicle. If one set of wheels, for example the rear wheels and especially if they are driven, are not dirigible in the same turning path as the front then there is both the vehicle directional force and the steered wheel directional force.

FIGS. 7 and 8 have shown the familiar Ackerman steering which is designed to turn wheels on a common center. Similarly, keeping in mind the capability each wheel can have of angling both vertically and rotating on the vertical axis, and moving sin-like and sideways on the wheel paths of travel over the longer distance as shown by ad in FIG. 6 while the vehicle moves directionally in its line of travel, it will be appreciated that application of force or radiusing will change areas of contact.

FIG. 8 which shows more than one pair of steered wheels is also important because it shows, when the desirable multi-wheel steering is used, how the wheel which is turned more in FIG. 7 is turned less in FIG. 8 because all the wheels are steered. Multi or all wheel steering has many advantages. It is noteworthy that commercially available CV joints are limited to approximately 35 to 50 degrees of angling. Regardless of whether a CV joint or a less sophisticated coupling is used the effectiveness of sin and side action is increased as the angling is increased.

Especially when wheels are articulated as shown in FIG. 8 and joined for effective contact, especially without differentials, and when as disclosed, wheels have more effective traction surfaces it will be appreciated that a basic or master brake (not shown) can effectively and feasibly be fitted rather than, as usual, having brakes fitted to each wheel. In addition to the economy of not necessarily requiring a brake on each wheel it will be seen that a vehicle having this enhanced traction would perhaps be running in water or mud. Also the traction segments or vanes which are described below are more effective without brake calipers in the fluid stream of the traction medium. And of course mud or sand would quickly make the brakes inoperative. Also, if a wheel brake had a rotor as with disc brakes it would lessen the traction area of contact provided by the traction segments.

It is to be noted that non-steered wheels can be driven wheels but also even if non driven wheels can use the X, Y and Z motion advantageously. It is again to be noted that with the changeable radiusing capability of the wheel which allows pairs of wheels or pairs of wheel sets to have the same axial speed or if full radiusing capability is not required and wheel assemblies are linked, preferably with proportional differentials of the type that transmit torque and speed proportionately to each side, contacting surfaces are accorded an input commensurate with rolling on arcs of circles with common centers as in FIG. 8, then slippage should be minimized.

Figure 9:
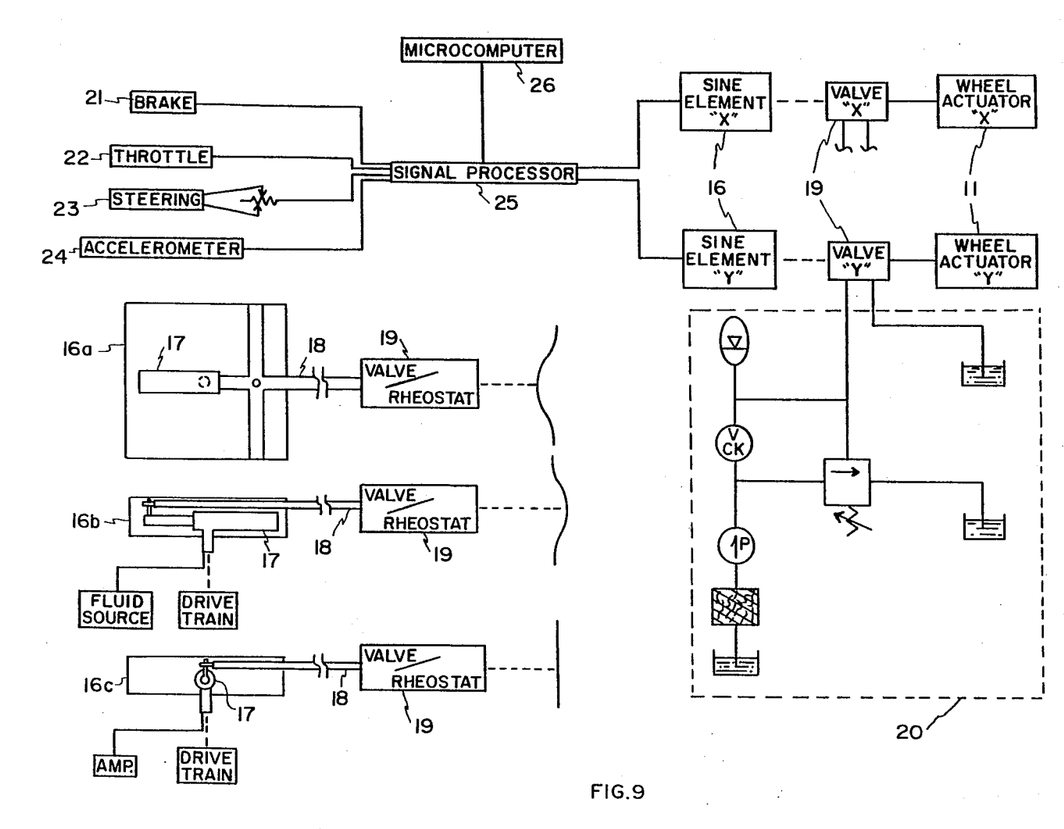
FIG. 9 is a schematic and also shows a sin element in actuating positions.

Referring now to FIG. 9 which diagrams operational components it will be further understood how wheel assemblies are operational. Above specifications and figures, especially FIGS. 6 and 8, have shown how enhanced traction is attained. Referring now first to ad in FIG. 6 which shows sin movement and noting there is some difference in the contacting surface path of travel depending on whether wheel is symmetrical as in ca or asymmetrical as in ba further understanding will be gotten as the functional characteristics and controlling sin elements, 16, are understood. An element preferably consisting of a radial member 17, which receives rotary motion and at the other, in operative connection, a linear member 18 called the impulse link, to change and transmit rotary motion to linear motion expressed on the contacting surface as X, Y and Z motion. The impulse link, which is slidably supported, powers or controls the wheel angulation by operative connection through a valve or rheostat, 19, which can, for example be the familiar hydraulic spool valve or if electric be a potentiometer type switch. In less sophisticated requirements it could itself directly transmit force to the rotating mass of the wheel. It will be realized that by varying the frequency of rotation into the sin element the distance covered by the wheel because its effective diameter is changed moving sin-like as it turns left and right (ad in FIG. 6) can be varied. This frequency change can be inputed quite simply by, for example, a ball on a disc which is familiar to designers of infinitely variable transmissions or electrically. The newer solid state devices such as the sin wave generator sold by Radio Shack with their 276 - 2336 number are inexpensive and accurate. A sin element such as a rotary variable differential transformer or a generator whose output can vary as a function of angular position could likewise be used to control the wheel electrically. If hydraulic the radial member can receive controlling fluid or current at that part on which it rotates which causes the impulse link to change effective length. Continuing to refer to FIG. 9 in 16a the sin element is shown in top view with the impulse link extended which results in contacting surface and track shown between 90 and 270 degrees in ad of FIG. 6. It is understood that this can apply to an actuator placed above the point of the wheel pivot or coupling. It is also understood that in case of more than one hydraulic actuator the outlet flow of one actuator can be the inlet flow of another especially if placed below the wheel pivot. Electrically this can also be done by using the sin element to phase control an electrically operated actuator. The sin element shown in 16b side view is rotated but with the same extension gives a sin curve opposite to 16a. Sin element 16c is shown with no extension which results in non-sin movement. Also it should be clearly apparent that by various actuator selections what is normally thought of as camber and castor are controlled but with greater magnitude. Also it is clear that the same actuator means can be used for the side movement Z shown stipled in ad in combination with the X and Y actuation. This can minimize actuators which would be necessary otherwise although clearly just as more than one or two actuators can be used for X and Y actuation one or two or more can be used for Z actuation as for example placing an actuator co-axially or proximate to the drive to the wheel. Similarly it will also be realized the same effect is attained by placing actuators for Y and Z radiusing and side movement between each wheel set rather than having two actuators for each on each side. Two Y and Z actuators may, for example, be proximately placed on the engine or transmission. These actuators, if hydraulic, can be of the single cylinder type with force application from each end. A single cylinder type with internal rack and pinion will operate with equal force. These commonly available types have been featured in the Machine Design Fluid Power References issues. Regardless of the particular arrangements of the actuators it will be appreciated that since principal operation can be in economy or minimum contact mode, to lessen power requirements and minimize component wear, appropriate valving and positioning of actuator will be used. For fluid actuators appropriate valving is used to direct amount and direction and also change direction of fluid flow so that in deceleration an accumulator can be charged. Likewise electric current flow can be directional for accumulation in a battery functioning similarly to an accumulator. If the actuators are electric they can be equipped with a worm gear or brake to serve as the check valves shown for hydraulic operation. While these actuators can exert equal force over equal distance and be used especially in conjunction with driven pairs of wheels having regular non-rigidly locked differential action sometimes the wheels would preferably be radiused commensurate with their turning arcs as in FIG. 8 and so this is done by adjusting the effective length between the actuator and the wheel using for example input signaled from the steering linkage which can be potentiometers or hydraulic valving. As with actuator placement on the carrier the operational connection is between the rotating mass of the wheel and the vehicle mass regardless of whether sprung or unsprung.

Understanding of the simplicity of the operation, if not gotten on a first reading can be had by again picturing a coupling or CV joint as the axial center. Again it is possible in case of steerable wheels for the steering linkage to be outside and overriding the envelope or somewhat elliptical sphere in which the wheel moves. So even with applied motion as shown by ad it is possible to have steering. Now first regarding asymmetrical illustrations c and so forth and visualizing the center of the wheel as riding on central, minimum contacting surface and the sin element as pushing or pulling the wheel on the axial center it follows that with no adjusting movement in the radial linkage, that is to say when the impulse link has unchanged length, there will be no change in position imparted to the wheel. If there is a lengthening of the radial linkage then the wheel is moved. The amount of sin movement, if considered for example to begin at 2 of ad is a function of radial linkage length and if it is increased the side component of the sin curve is increased which is shown as the wheel path progresses through to and past 360 degrees. The above example is for one imparted movement, say for the actuator shown in FIG. 2. Movement by the actuator shown in FIG. 3 which turns mainly on the Y axis has also to be visualized, first realizing that if wheel actuator is not positioned for Y or vertical movement there is the requirement for coordinated movement by another actuator. It can now be realized that this other actuator serves to position the wheel against side force which would otherwise turn the wheel. This side force is in ordinary wheels opposed by the journaling of the wheel on an axle in non-steered wheels or in case of steered wheels by the steering linkage. It is known that structural strength or support is also given by the suspension link members called struts or control arms. But now secondly realizing that movement by one actuator, as in the above example, will only change the tilt of the wheel turning it on a line parallel to the X axis drawn through the CV joint so that what is called camber is changed, it is further realized that for X and Y movement some movement is required by the second actuator so that the line parallel to the X axis angles so the wheel will track along the sin line. The above discussed 2 actuators. In practice engineering design economy might indicate, for example, four actuators arranged in counter pairs in an X fashion with two of each pair at same levels.

In ad of FIG. 6 the stipled area which is shown phased with the sin curve shows the sideways or Z movement. Without the above X and Y sin movement there is the advantage that track width between wheels is changeable. But more important with sin movement there is a swept or side force area. Whether on surfaced roadways or on surfaces as shown by bd and cd in which a fuller amount of contacting surface is effective this is a highly desirable capability. In discussion related to FIG. 9 it will be shown that the side surface of the wheel is also operative in fluids. Because of the combined effect of steering and changeable radius and with the possible conjoined angling of the wheels there is effective propulsion, especially with the conjoined angling of the wheels in axle sets. This can be described a "V"ing or visualized by the tracking of wheels along sin curves as shown by ad of FIG. 6 even, as in FIG. 8, when the vehicle is turning with the wheels in concentric circles.

Continuing with operation, transducers for functions of brake, throttle, steering and accelerometer which as shown respectively by 21, 22, 23 and 24, signal operational parameters. As has been shown above operation can be electrical or mechanical which includes hydraulic or both. These parameters are processed by the signal processor 25 and the microcomputer 26, having a microprocessor. When the transducers signal changed actuation when the wheels are actuated to change traction it is desirable that air pressure be changed. Apparatus for this consists of common apparatus (not shown) including an air supply valve and air conduit and supply apparatus.

Speed is important in activating the transduced parameters and this air apparatus is complementary in actuating the wheels for effective radius. Indicative of the type of art which has been common in changing air pressure is U.S. Pat. No. 4,313,483 and earlier patents. The speed of changing air pressure to vary contacting surface is also important as a wheel is angled or radiused and moved sideways as in FIG. 6. The changing support of the sidewalls with different air pressures as the relative load on each sidewall is changed with resulting change in shape and working radius and contact surface is apparent. The tangible disclosed specifying factors determining traction and shape especially if there is some flexibility in the non-rigid part of the wheel are: inertial resultant loading, air pressure and unloaded shape, composition and grip pattern of the contacting surface bands, and the material strength of the flexing contact and side sections and also the aspect ratio of width and height. Regardless of whether the cross sectional shape of the wheel is largely symmetrical or asymmetrical there is what may be called the squash of both side sections the extent of which is related to the above factors. Also if the rigid section of the wheel on which the side sections are seated is of different diameters as is possible this can because of the above factors, accentuate radiusing. Of above factors the more important is the capability of lessening air pressure in conjunction with radiusing the wheel which will more quickly increase the contacting surface area.

Accelerometer data control is mainly processed to reduce undesired side motion such as skidding and of course velocity change for wheel actuation. It is desirable that speed of processing allow actuation to begin in milliseconds. It is also desirable regardless of whether vehicles have limited slip or torque reaction type differentials or whether wheels are steered, driven or have more than one wheel, dual wheels for example, on each coupling or CV joint that sensor and comparator apparatus be linked with the microprocessor. As a minimum, since the input to the sin element should be controllable, sensor transmission of at least the speed of one wheel with data comparatively operative through the microprocessor to actuate the wheels is desired. This equipment is common to, for example, various anti skid devices. Amplifier and signal converter means are not shown, these can include analog-digital converters in communication with a microprocessor. Also a reference and control signal for wheel speed is desirable. This can integrate wheel speed sensors with vehicle speed.

As stated above elements can be hydraulic or electric. Operationally the valves or rheostats shown at 19 controlling the actuators and the actuators 11 can be hydraulic or electric. Shown at 20 is a typical hydraulic system with various well know features including valves, a pump and so on. An accumulator which increases efficiency is shown. It is apparent that if the actuator is electric the function of the accumulator can analogously be done by a battery. The actuator, if electric, can be a motor preferably with an associated worm gear (so that the counter force against the wheel doesn't change desired radiusing) or an actuator of the Saginaw type. Because of the balanced, enhanced traction especially when using the sin capability it is desirable to have the accumulator capability. As the wheels move as shown in ad of FIG. 6 as the vehicle is decelerating the sideways movement of the wheels can generate power with appropriate valving or switching through the accumulator. The accumulator can also be connected directly to the vehicle drive so that when decelerating energy is accumulated.

It has been shown above and in FIG. 9 how traction and performance are enhanced by showing how sin and side capabilities of the wheel are operative. Conventionally present traction enhancers are usually chains or cables or studs. Regardless of whether studs are set in resilient tires or whether wheel has all or in part partly a non-resilient contacting surface with or without traction elements as for example the type of protrudance found in steel wheeled tractors the advantage of radiusing the wheel as explained is usefully applicable with different traction aids. These can be the chains of the full over the wheel type usually fitted over both sides of the wheel and which can be tensionable. The different conventional traction enhancers are quite well known as are their respective advantages and disadvantages. Though these types are all usable with the radiusable wheel, traction enhancers of the type shown at 27 in FIG. 10b are advantageous. The surface contacting parts of the enhancer, 28, are termed traction elements. These can be bolted to the traction enhancer and biased inward by a spring (not shown). It will be apparent that fitted to resilient wheels these elements could be flexible to conform to the changing shape of the side surface as are conventional traction aids. But also as they lie at an angle diagonally or perpendicular to wheel travel across the contacting surface they should be largely non-flexible to resist the traction force. As stated below these elements can be advantageously sized to attach easily rather than requiring fitting from both the inside and outside side surfaces. Preferably the elements can derive support from being set in depressions of the contact surface or derive support from fasteners securable either in the resilient surface or other parts of the wheel body. Support is also derivable from tensioning either by screw or lever or other conventional tightening or by air pressure or both so that the traction enhancers are held to the wheels, so that the wheel and traction enhancers rotate in unison rather than slip under load. Fastening provision nearer the middle of the wheel body can be by simple screwthreadable devices proximate the center of rotation. The type of traction enhancer shown in FIG. 10b is cited because of its unique character as it operatively cooperates with the wheel as the wheel varies contact surface. It will be noted the cross links or traction elements can be coextensive only with that part of the contact area used for full traction thus allowing smooth running on traction capable surfaces of the non-augmented contact surface without removal of the traction enhancer. Also to be noted is ease of application of this less than full surface type since the wheel can be radiused or angled allowing a traction enhancer to be easily attached and removed. Other of the known types of enhancers of the chain or cable type whether having one or more traction elements such as a chain or similar in which a belt passes through the wheel can be used. As stated below these are distinguished from the above type in which the traction elements do not cross completely from one side surface over the minimum contacting surface to the other. All these types which usually have a cross link or traction element crossing the contact surface which on regular wheels means the traction element is unchangeably, unless removed, in contact with the traction surface can, by setting that part of the traction element which would ordinarily be in constant contact into a depression or cavity, avoid disadvantages such as wear and noise. If the surface is of the molded type this is easily done. Disadvantages are also avoided by having a material such as belting on that part of the traction element which crosses that part of the contact surface used for minimum traction which is shown in FIG. 6 by aa, ba and ca. It should be noted that these types are amenable to support on or from both sides of the wheel as well as the support described above. It is important to note that all of these types can be advantageously used with the radiusable wheel often with multiplied advantage. This is so since a regular wheel which rotates on a constant axis can slip even with chains since the effective contact area from which tractive force is transmitted is limited to a small area vertically under the wheel center. Even in soft terrain in which a regular wheel sinks or in water, although the contact area is increased there is invariably slippage because rather than a firm traction surface which would not allow the wheel to sink there is slippage since fluid or ground particles are displaced or moved out of position relative to one another and rotate with the wheel rather than remaining in relative position. But with the sin action there is a side traction as all the wheel side and bottom bears against the traction medium so that effective contact area is markedly increased with traction enhancers.

Figure 10A:
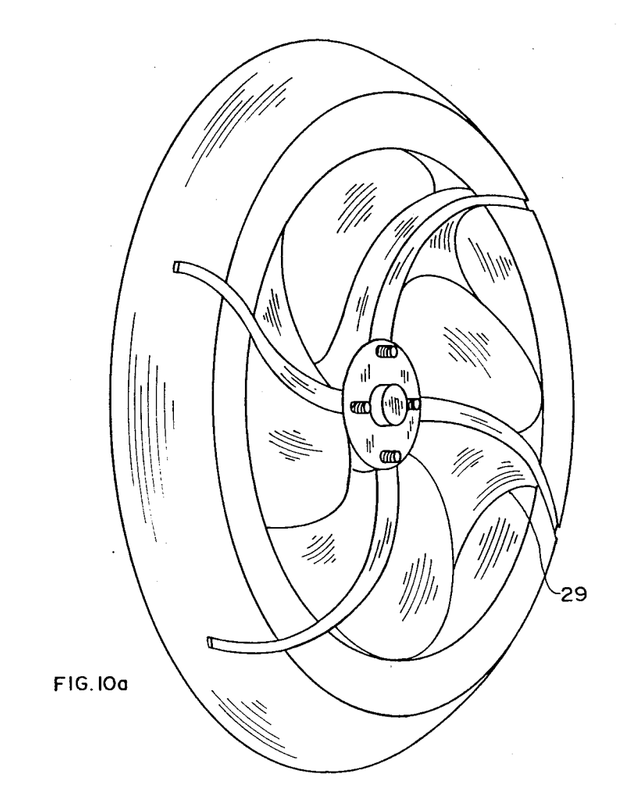
FIG. 10a shows vanes which increase traction provided by the sides of the wheels.
Figure 10B:
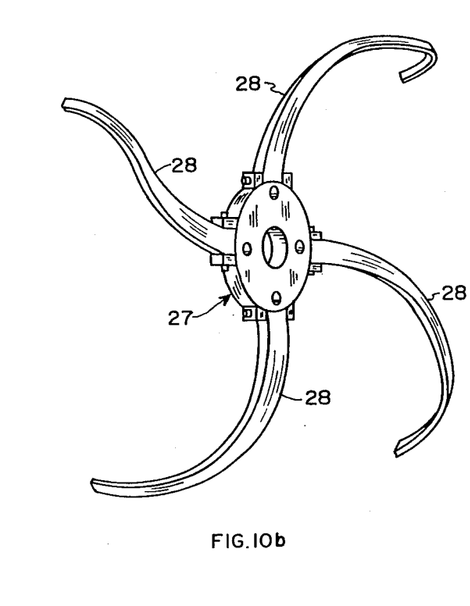
FIG. 10b shows a traction enhancer which increases effectiveness of the contacting surface and the vanes.

Of significance are vanes or web-like convex-concave formings shown in FIG. 10a by 29. These vanes will, in a fluid or soft terrain, especially with both sin and side action when wheel is rotated, push the vehicle forward or to the rear depending on direction of wheel rotation.

With the radiusing capability it is markedly advantageous to select for use either that part of the surface not augmented by the traction enhancer or to vary amount of traction enhancer augmented surface depending on need. This is significant because in operation only the necessary traction is applied. As surfaces change from traction capable to, for example, ice, the wheels are radiused so the enhancer is operative. Thus disadvantages of unnecessary chain or stud wear are overcome along with wear on vehicle, noise, and limitations of speed and control because enhancer is only in contact as needed. Usually, depending on expected conditions, the harder compound on the minimum contacting surface would be complemented by one or more bands of other compounds having perhaps different tread patterns. Also, depending on conditions, studs or other metallic and non-metallic bits could be set in an outer band for an abrasive, gripping action. Because of the selective use of the augmented traction surface there are only the advantages without the disadvantages. To an extent these studs or bits will lessen the need for use of traction enhancers but of importance they can also be used even on dry, hard surfaces.

Although alternatives and/or modifications to the present invention are possible by those skilled in the art it is intended that all such alternatives, modifications and equivalents are included within the scope of the invention as covered by the appended claims.

I claim:

1. A traction enhancing wheel and support assembly comprising:
    a wheel,
    a wheel support,
    a coupling means between said wheel and said wheel support for allowing movement of said wheel relative to said support in the transverse horizontal and vertical planes,
    a first actuator connected between said wheel and said wheel support for controlling movement of said wheel is said transverse horizontal plane,
    a second actuator connected between said wheel and said wheel support for controlling movement of said wheel in said transverse vertical plane,
    and control means adapted to move each of said actuators to allow said wheel to move along a predetermined path of travel.

2. A wheel as in claim 1 wherein said control means further comprising interfunctioning circuits to process brake, throttle, steering and accelerometer parameters to radius said contacting surface.

3. A wheel as in claim 2 in which at least one of the predetermined parameter values can be selectively varied by the operator.

4. A wheel as in claim 1 having the rotating mass of the wheel connected by actuating means to the non-rotating part of the wheel assembly from which the actuation is transmitted from a source of power to the rotating mass.

5. A wheel as in claim 1 in which the non-rotating part of the assembly which carries the rotating part is a part of an unsprung suspension system.

6. A wheel as in claim 5 in which the non-rotating part of the assembly which supports and actuates the rotating part is a part of a vehicle suspension system of which the wheel assembly is unsprung and which further comprises an input member operatively connected to a source of power and coupled to an output member.

7. A wheel as in claim 1 in which the input member driving the coupling is ripidly journalled and is in a fixed angular relationship to the carrier.

8. A wheel as in claim 7 in which the non-rotating part of the assembly which supports and actuates the rotating part is supportably attached to the vehicle of which the wheel is a part.

9. A wheel as in claim 1 in which there is at least one actuator for each of X and Y actuations, said actuators being separately and jointly actuable operatively connecting rotating and non-rotating parts of wheels for linear, linear and curvilinear, linear and curvilinear and sinoisoidal, and linear and curvilinear and sinoisoisdal with side movement in substantially forward and reverse directions.

10. A wheel as in claim 1 that is journalled for sideways actuation and movement of the effective point of usual wheel rotation in spaced relation to the vehicle.

11. A wheel as in claim 1 having both journalling for sideways actuation and a curved bearing surface which coperatively allow controlled amounts of X, Y and Z movement.

12. A wheel as in claim 1 in which a second coupling is operatively connected between a source of power and said coupling on which the contacting surface is actuated.

13. A wheel as in claim 12 in which said second coupling is of the constant velocity type.

14. A wheel as in claim 1 further comprising a resilient contacting surface.

15. A wheel as in claim 14 further comprising said surface being coupled for rotation and being:
    integral on said wheel and,
    having a shaped body with a variable contacting surface conjoined on the resilient shaped body with contacting side surfaces, and
    coupled for rotation and having an input member connected for rotation driven by a source of power and which is coupled to an output member so that the wheel is radiusable for movement produced by combinations of X, Y and Z actuation.

16. A wheel as in claim 15 in which the shaped body with resilient contacting side surfaces can flex and vary contacting area according to relative support of walls which is a function of amount of radiusing of wheel and internal pressure.

17. A wheel as in claim 1 in the coupling has a curved bearing surface on which the plane of rotation can be varied.

18. A wheel as in claim 17 in which the coupling is of the Constant Velocity type.

19. A wheel as in claim 18 in which the coupling is operative with lubricant.

20. A wheel as in claim 1 wherein the actuating means radiusing the rotating mass of the wheel from the non-rotating part of the assembly allows the multi-directional freedom of motion equivalent to that of a ball joint.

21. A wheel as in claim 1 having actuators linked to the wheel which actuate the wheel and by being linked provide at least some of the strength usually provided by control arms.

22. A wheel as in claim 1 in which the wheel is one of a set in which the wheels are radiusable for differential action according to arcs of respective turning circles.

23. A wheel as in claim 1 in which actuating means consist of a system having electric and hydraulic elements.

24. A wheel as in claim 1 in which actuating means are electrically powered.

25. A wheel as in claim 1 in which actuating means are hydraulic.

26. A wheel as in claim 25 in which hydraulic actuating means include an accumulator.

27. A wheel as in claim 1 comprising means in the hub adapted to receive a traction enhancer and having means on the contacting and side surfaces to receivably secure traction elements.

28. A wheel as in claim 27 in which the traction enhancer has traction elements which:
rotate on the same axis as the wheel,
extend over part of the contacting surface,
are preferably flexible to conform to the contacting and side surfaces,
are largely non-flexible against the force of traction, and
are preferably pivoted to move with the flexing of the resilient contacting surface.

29. Wheels as in claim 28 which further comprises depressions to hold and contain in the augmented contact part of the surface a part of the cross over elements of a traction aid with cross over traction elements which are fitted over the outer contacting side surface and also which can, the length of cross over elements permitting, be fitted over the inner contacting side surface.

30. A wheel as in claim 29 in which traction elements are shaped complementary to vanes of wheels so that vanes and traction elements cooperatively increase traction.

31. A wheel as in claim 1 having vanes for traction in fluids and semi-solid material.

32. A wheel as in claim 31 in which vanes have curved surfaces and are spaced relative to the hub and to each other and which allow cooperative fitting of traction elements for enhanced traction.

33. A wheel as in claim 32 in which vanes extend radially outwards from the hub and in which at least some of the raised traction segments on the contacting and side surfaces are correspondingly contiguous with vanes for effective force application.

34. A wheel as in claim 31 in which vanes are structurally integral with the hub and outer part of the wheel.

35. A wheel as in claim 31 in which vanes are of a material similiar in durability to that of the contacting surface.

36. A plurality of wheels as in claim 1 in system connection capable of changing traction and track by varying the usual axis and axes of rotation to produce the following motions:
linear,
linear and curvilinear,
linear and curvilinear with wheels in a set laterally Variable inwards,
linear and curvilinear and sinoisoidal,
linear and curvilinear and sinoisoidal and sinoisoidal with side movement 37. Wheels as in claim 36 in which the contacting surface is asymmetrical so that effective radius is variable.

38. Wheels as in claim 36 having a generally symmetrical contacting surface.

39. Wheels as in claim 36 further comprising resilient tires on wheels coupled operatively to a source of of power for rotation.

40. Wheels as in claim 39 in which resilient tires have a shaped form having a pair of contacting side surfaces on the shaped body conjoined with a variable contacting surface.

41. Wheels as in claim 36 in which the wheels have means connecting wheels of sets and a plurality of sets to a steering means so that the wheels can be steered while wheels are being actuated for any of the types of motion.

42. A wheel system as in claim 36 in which the plurality of wheels is an even number of wheels with the wheels on each side of the vehicle being radiusable proportionate to the turning arcs of the wheels.

43. Wheels as in claim 42 which are steerable.

44. Wheels as in claim 42 having wheels joined for drive in a set and having the actuating means radius the wheels for differential action rather than having the friction of the traction surface reactive in a differential and then transmitted to the wheels.

45. Wheels as in claim 36 in which the input member of the coupling is operatively connected to a central brake and being of the non-driven types is free to rotate.

46. Wheels as in claim 36 having input numbers transmitting braking action from a brake operative on vehicle drive elements which drive said input numbers.

47. A wheel as in claim 36 in which some of the contacting surface is intrusive in non-firm surfaces and which has traction segments on the contacting surface at least some of which are annularly angled to increase effectiveness of applied side force.

48. A wheel as in claim 36 with a contacting surface configured with bands of different composition and coefficients of friction and grip pattern.

49. A wheel as in claim 48 in which at least one of the bands has abrasive elements such as studs set in that part of the contacting surface used for more than minumum traction.

* * * * *